US00RE37773E

(19) United States
(12) Reissued Patent
Trombley

(10) Patent Number: US RE37,773 E
(45) Date of Reissued Patent: Jul. 2, 2002

(54) MUG

(75) Inventor: Edgar F. Trombley, Wayne County, MI (US)

(73) Assignee: Punch Products USA, Rahway, NJ (US)

(21) Appl. No.: 29/115,737

(22) Filed: Dec. 16, 1999

Related U.S. Patent Documents

Reissue of:
(64) Patent No.: Des. 387,620
Issued: Dec. 16, 1997
Appl. No.: 29/064,092
Filed: Dec. 11, 1996

(51) LOC (6) Cl. ..... 07-01
(52) U.S. Cl. ..... D7/511; D7/523
(58) Field of Search ..... D7/507, 510, 511, D7/530, 619, 622, 515, 509, 536, 533, 523; D9/531, 537, 516, 556; 220/742, 671, 672, 630, 713, 675, 673, 737

(56) References Cited

U.S. PATENT DOCUMENTS

| | | | | | |
|---|---|---|---|---|---|
| D263,916 | S | * | 4/1982 | Reece | D7/510 |
| D286,967 | S | * | 12/1986 | Appel | D7/511 |
| D351,314 | S | * | 10/1994 | Sokolski et al. | D7/536 |
| D364,071 | S | * | 11/1995 | Lynd | D7/510 |
| D365,247 | S | * | 12/1995 | Sokolski et al. | D7/511 |
| D369,063 | S | * | 4/1996 | Meisner | D7/533 |
| 5,531,353 | A | * | 7/1996 | Ward et al. | 220/729 |
| D373,051 | S | * | 8/1996 | Kramer et al. | D7/536 |

* cited by examiner

*Primary Examiner*—M. N. Pandozzi
(74) *Attorney, Agent, or Firm*—Howard C. Miskin; Gloria Tsui-Yip

(57) CLAIM

The ornamental design for a mug, as shown and described.

DESCRIPTION

FIG. 1 is a top front perspective view of a mug showing my new design;
FIG. 2 is a top plan view of FIG. 1 ;
FIG. 3 is a bottom plan view of FIG. 1 ;
FIG. 4 is a rear view of FIG. 1 ;
FIG. 5 is a front view of FIG. 1 ;
FIG. 6 is the left side view of FIG. 1 ;
FIG. 7 is the right side view of FIG. 1 ;
FIG. 8 is a top front perspective view of a mug showing a second embodiment of my new design, all sides being the same as embodiment 1 save for the transparency of the sidewalls; and,
FIG. 9 is the front elevational view similar to FIG. 5 , partially broken away to show the spaced apart outer and inner layers in section.
The broken line showing of the word[,] "punch" in FIGS. 8 and 9 [is], *the handle in FIGS. 1–5 and 7–9 and the tab in FIGS. 1–6 and 8–9 are* for illustrative purposes only and form[s] no part of the claimed design.

1 Claim, 4 Drawing Sheets

Matter enclosed in heavy brackets [ ] appears in the original patent, but forms no part of this reissue; matter printed in italics indicates the additions made by reissue.

AMENDED

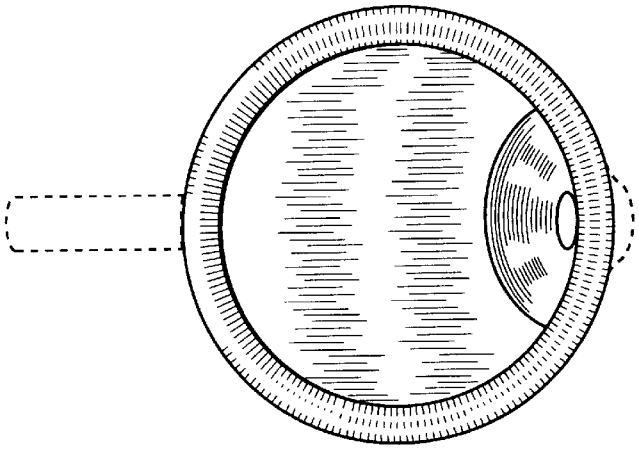
FIG. 2
AMENDED
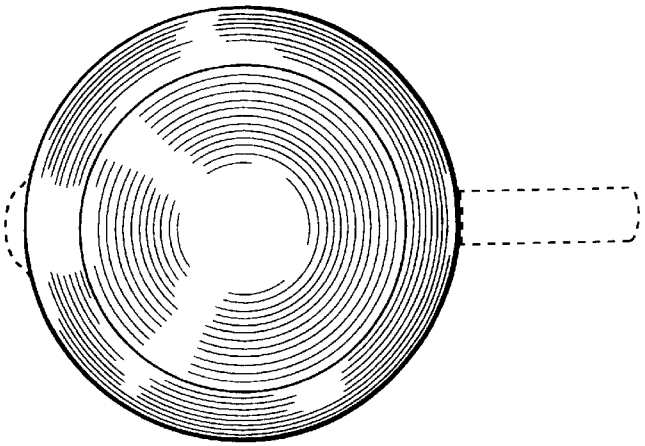
FIG. 3
AMENDED
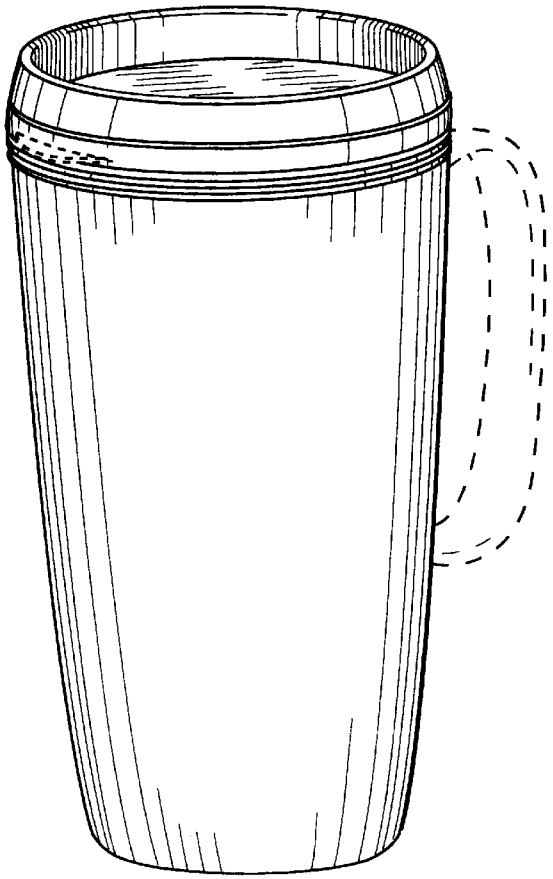
FIG. 1
AMENDED

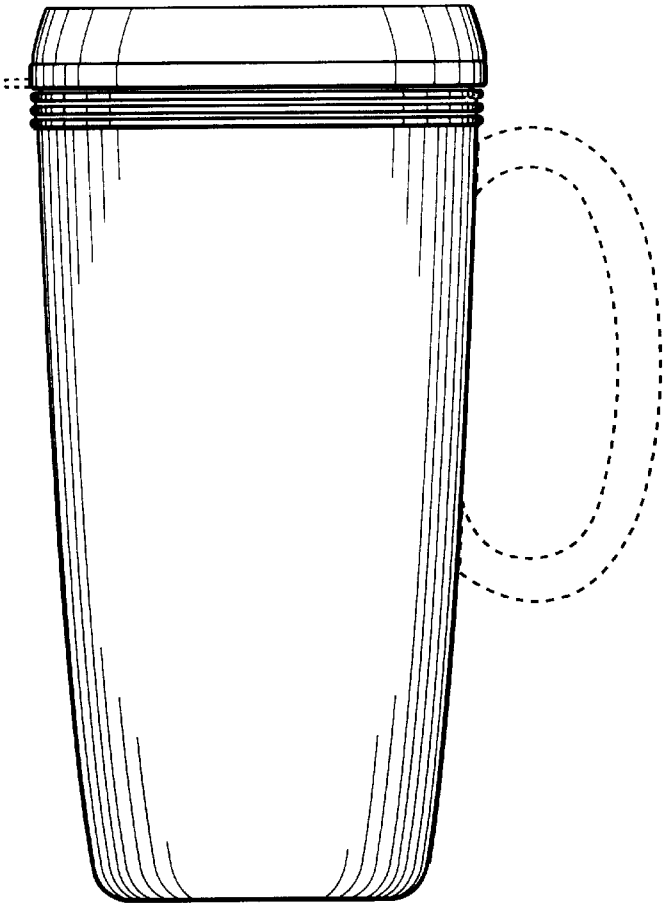
FIG. 5
AMENDED
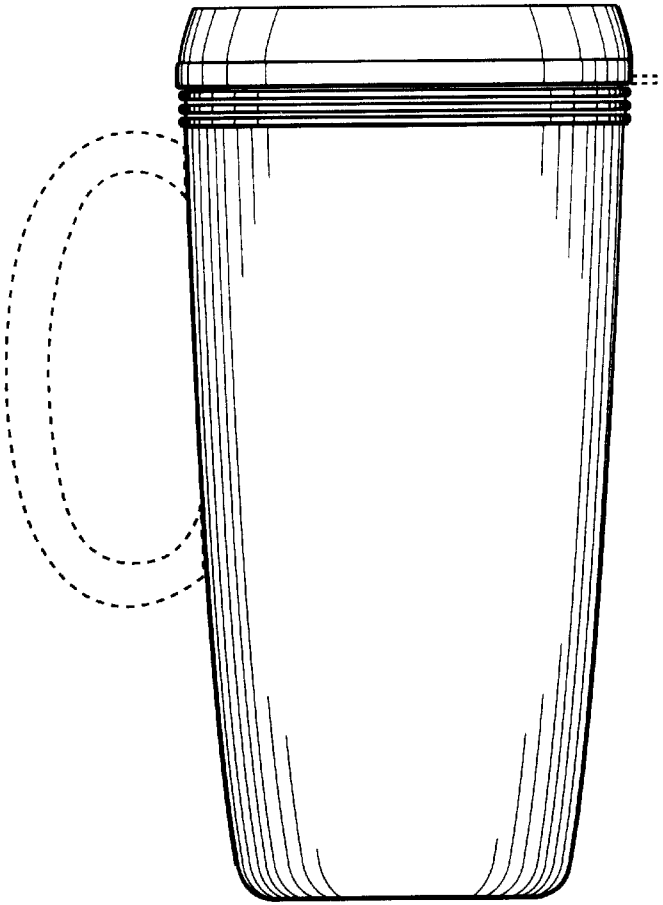
FIG. 4
AMENDED

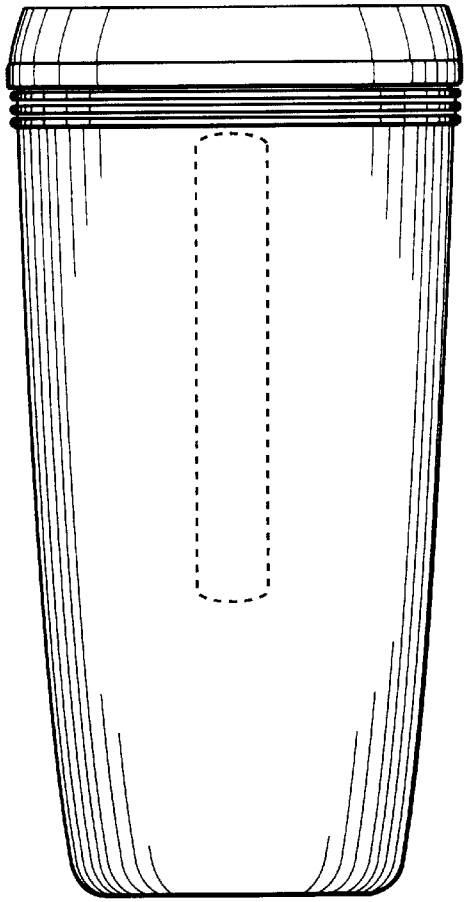
FIG. 7
AMENDED
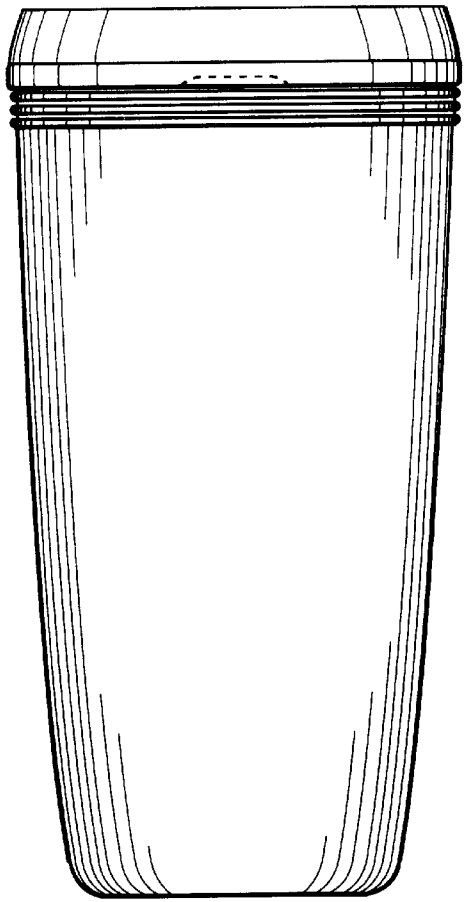
FIG. 6
AMENDED

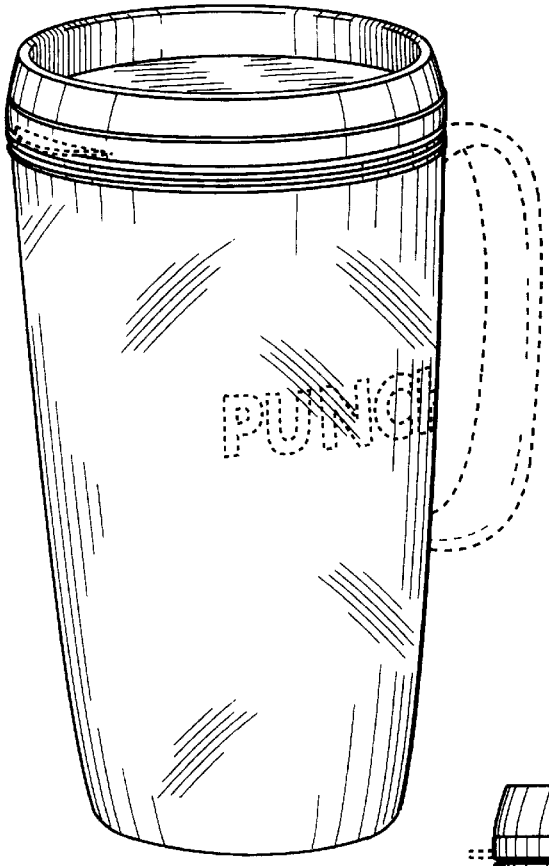
FIG. 8
AMENDED
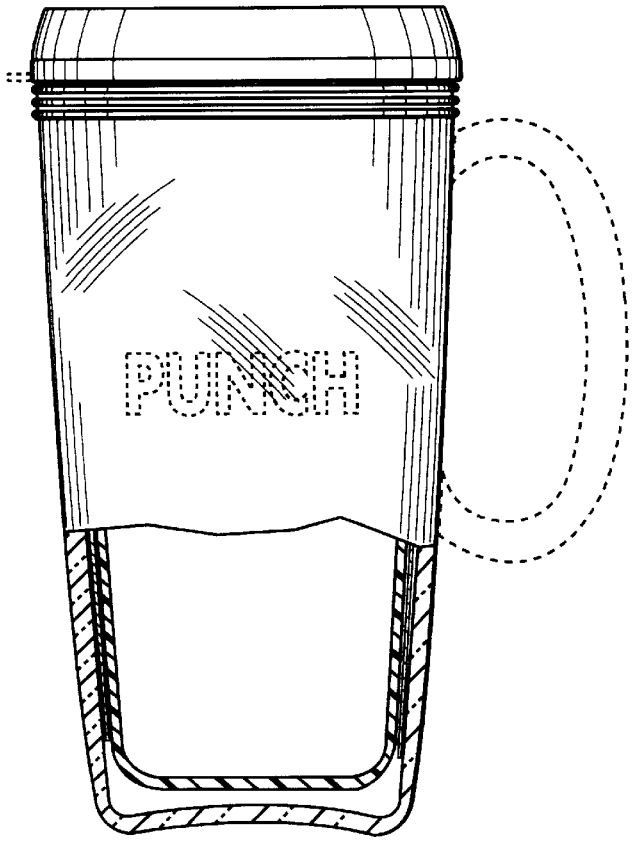
FIG. 9
AMENDED